US006992858B2

(12) United States Patent
Kaneko

(10) Patent No.: US 6,992,858 B2
(45) Date of Patent: Jan. 31, 2006

(54) MOUNTING MEMBER MADE OF GLASS FOR A MAGNETIC DISK AND METHOD FOR FABRICATING THE SAME

(75) Inventor: Masami Kaneko, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 182 days.

(21) Appl. No.: 10/386,521

(22) Filed: Mar. 13, 2003

(65) Prior Publication Data

US 2003/0179494 A1 Sep. 25, 2003

(30) Foreign Application Priority Data

Mar. 18, 2002 (JP) ............................ 2002-074809

(51) Int. Cl.
*G11B 17/02* (2006.01)

(52) U.S. Cl. .................................................. 360/98.08

(58) Field of Classification Search ............. 360/98.08, 360/99.05, 99.12
See application file for complete search history.

(56) References Cited

U.S. PATENT DOCUMENTS

| | | | | |
|---|---|---|---|---|
| 5,760,999 | A | 6/1998 | Yahata | |
| 6,215,617 | B1 | 4/2001 | Okumura et al. | |
| 6,819,526 | B2 * | 11/2004 | Kataoka et al. | 360/99.08 |

* cited by examiner

*Primary Examiner*—Robert S. Tupper
(74) *Attorney, Agent, or Firm*—Oblon, Spivak, McClelland, Maier & Neustadt, P.C.

(57) ABSTRACT

A glass ring 2, which includes an inner peripheral surface 4, an outer peripheral surface 3 and annular contacting surfaces 5 for contact with magnetic disks and is formed in a ring shape having a rectangular vertical cross-section, is fabricated. The glass ring has at least the contacting surfaces 5 lapped and then etched to have a desired surface roughness so as to improve a surface property. Additionally, the roughened surfaces of the etched contacting surface have an electrically conductive film 6 formed thereon, providing a spacer ring.

4 Claims, 3 Drawing Sheets

MOUNTING MEMBER MADE OF GLASS FOR A MAGNETIC DISK AND METHOD FOR FABRICATING THE SAME

BACKGROUND OF THE INVENTION

1. Field of the Invention

The present invention relates to a mounting member made of glass for a magnetic disk and a method for fabricating the same.

2. Discussion of Background

As shown in FIG. 8, a magnetic disk drive, which has been used as a media unit, secures a plurality of hard disks or magnetic disks 11 between a flange 14 and a clamp 17 by alternately mounting the magnetic disks 11 and spacer rings 10 to a mounting shaft 15 with the flange 14 in stacked fashion, putting a shim 16 on the top magnetic disk 11 and tightening the clamp 17 on the shim by bolts 18. When the magnetic disks are rotated by a rotary shaft 13, magnetic heads 12 read or write information, moving above the magnetic disks in floating fashion.

Each of the magnetic disks has a magnetic film formed on a substrate thereof. As the material for the substrate, there have been known aluminum, glass, ceramics and the like, though only aluminum and glass are put into practical use. As the material for the spacer rings 10, there have been known metal, such as aluminum and stainless steel, glass and ceramics. What is necessary for the magnetic disks is that the distance between a magnetic disk and its related magnetic head becomes as small as possible to record information in high-density and high-capacity. From this viewpoint, the magnetic disks are significantly required to have flatness and surface smoothness. Hard glass with good flatness is extremely superior to an aluminum substrate as the substrate for the magnetic disks since that sort of glass can effectively obtain required surface flatness and is adapted for a reduction in weight and size.

When the magnetic disks 11, the mounting shaft 15, the spacer rings 10, the shim 16 and other mounting members in the magnetic disk drive are different from each other in terms of the thermal expansion coefficient of the materials thereof, a thermal expansion difference is created by a temperature difference between an operating time and a non-operating time, and a magnetic disk 11 is distorted by a strong external force given by its related spacer ring 10. When the magnetic disk 11 is distorted, it becomes difficult to keep the distance between the magnetic disk 11 and its related magnetic head 12 constant all the time during operation. As a result, a change in the distance of the magnetic head 12 to the magnetic disk 11 causes an error in reading or writing information. When the degree of distortion becomes great, there is also a possibility that the magnetic head 12 related to the magnetic disk 11 gets in contact with the surface of the magnetic disk to damage the magnetic film.

In order that, in particular, the magnetic disks 11 and the spacer rings 10 accord with each other in terms of thermal expansion coefficient and minimize the distortion due to a thermal expansion difference so as to avoid a serious problem, it has been proposed that aluminum spacer rings be used for magnetic disks with an aluminum substrate, and that spacer rings made of ceramics having a thermal expansion coefficient approximate to that of glass or made of glass be used for magnetic disks with a glass substrate.

With respect to the fabrication of the spacer ring from glass, i.e., JP-A-10-074350 discloses that a glass ring is first formed, the glass ring has both lateral surfaces as the contacting surfaces for contact with magnetic disks lapped to have required flatness and parallelism, and the glass ring has an electrically conductive film formed thereon such that static electricity charged on a magnetic disk is discharged outside.

Additionally, it has been disclosed in JP-A-9-44969 (corresponding to U.S. Pat. No. 6,215,617) that the material of a holding member, such as a spacer, is selected in accordance with the material of a magnetic disk so as to have thermal expansion coefficient approximate to that of the magnetic disk, e.g., when the magnetic disk is made of glass for instance, ceramics or glass whose thermal expansion coefficient is approximate to that of the magnetic disk is used. It is also disclosed that the contacting surface of a holding member for contact with the magnetic disk is made to have a surface roughness from 0.1 to 0.2 $\mu$m in terms of the average roughness Ra at the centerline since rapid rotation causes a slip to occur between the magnetic disk and the holding member when the contacting surface of the holding member is too smooth. It is also disclosed that the holding member has an electrically conductive film coated thereon at a thickness of 0.1 to 3 $\mu$m in order that static electricity charged on the magnetic disk is effectively discharged outside.

In conventional magnetic disk drives, glass spacers, whose thermal expansion coefficient is the same as or approximate to that of magnetic disks made of glass, can be used to minimize the distortion of the magnetic disks due to a thermal expansion difference between the magnetic disks and the spacers, avoiding the occurrence of a reading or writing error caused by distortion of a magnetic disk. However, the conventional magnetic disk drives have created a serious problem in that particles (dust) are generated from the glass spacers or the like to disturb the long-term reliability for the magnetic disk drives.

One of the reasons of the dust generation is estimated to be that particles generated during the polishing treatment remain and adhere on the polished surface without being eliminated even after thoroughly washing, and that even if the polished surface is coated with an electrically conductive film as stated earlier, the particles fall away along with parts of the electrically conductive film during a long-term use with deterioration of the electrically conductive film. Another reason is supposed to be that by lapping the contacting surfaces of the spacers for the purpose of improving the flatness and the parallelism of the contacting surfaces and bringing the contacting surfaces into roughened surfaces as stated earlier, the polished surfaces are made of concavities and convexities with relatively sharp leading ends, and that when the magnetic disks are firmly sandwiched between the surfaces with the concavities and convexities, particles come off and drop from sharp ends. In particular, in the case of the spacers being made of ceramics, particles are easily generated from the spacers as porous sintered products in terms of material property, which is notorious in comparison with spacers made of other material.

Since the conventional spacers have the contacting surfaces made of polished surfaces with sharp concavities and convexities, the conventional spacers have created a problem that surface roughness can be increased beyond a certain level as there is a limit to the surface roughness. Only spacers having a small surface roughness and an insufficient anti-slip property have been generally available in practice.

In the case wherein the contacting surfaces of a glass spacer are polished to be brought into roughened surfaces in order to improve an anti-slip property for magnetic disks, when sharp ends of the concavities and convexities forming the polished surfaces come off in use, there is created a problem that the magnetic disks are apt to slip since the clamping force to the magnetic disks mounted to a magnetic disk drive becomes weaker. In order to cope with this problem, there is a proposal to preliminarily make the clamping force stronger. However, when the clamping force is increased beyond a certain level, there is a possibility that the magnetic disks could be distorted.

SUMMARY OF THE INVENTION

It is an object of the present invention to solve these problems. A wide variety of development and research have been made about how to avoid the dust generation in the conventional spacer rings made of glass and how to mount the spacer rings so as to avoid the dust generation. The present invention is provided by finding that the object can be attained by improving the surface property of a polished spacer ring with an etching treatment.

Specifically, the present invention is characterized in that a mounting member made of glass for a magnetic disk has at least a contacting surface for contact with a magnetic disk made into a roughened surface by etching or made into a roughened surface by polishing and then etched. The present invention provides a mounting member made of glass for a magnetic disk and a method for fabricating the same, which are, respectively defined as follows:

1) A mounting member made of glass for a magnetic disk, which is used for firmly mounting a magnetic disk to a magnetic disk drive, comprising a contacting surface for contact with a magnetic disk; and the contacting surface being formed as a roughened surface by etching.
2) The mounting member according to item 1, wherein the mounting member comprises a spacer ring, which includes annular contacting surfaces for contact with magnetic disks and is formed in a ring shape having a rectangular vertical cross-section, and wherein at least the contacting surfaces of the spacer ring are formed as roughened surfaces by etching.
3) The mounting member according to item 1 or 2, wherein a contacting surface has an electrically conductive film formed on at least the roughened surface made by etching.
4) The mounting member according to item 1, 2 or 3, wherein the roughened surface has a surface roughness of Ra from 0.3 to 1.0 μm and Rp from 0.8 μm or more.
5) A method for fabricating a mounting member made of glass for a magnetic disk, which is used for firmly mounting a magnetic disk to a magnetic disk drive, comprising preliminarily providing a glass product employed for fabricating a mounting member made of glass; etching at least a surface of the glass product for contact with a magnetic disk with an etching solution; and making the etched surface into a roughened surface.
6) A method for fabricating a mounting member made of glass for a magnetic disk, which is used for firmly mounting a magnetic disk to a magnetic disk drive, comprising preliminarily providing a glass product employed for fabricating a mounting member made of glass; and etching at least a surface of the glass product for contact with a magnetic disk with an etching solution; followed by forming an electrically conductive film on at least one portion of the etched surface.
7) A method for fabricating a mounting member made of glass for a magnetic disk, which is used for firmly mounting a magnetic disk to a magnetic disk drive, comprising preliminarily providing a glass product employed for fabricating a mounting member made of glass; and making at least a surface of the glass product for contact with a magnetic disk into a roughened surface by polishing, and then etching at least one portion of the roughened surface with the etching solution, followed by forming an electrically conductive film on at least one portion of the etched surface.
8) The method according to item 5, 6 or 7, wherein the mounting member comprises a spacer ring including annular contacting surfaces for contact with magnetic disks and formed in a ring shape having a rectangular vertical cross-section.
9) A method for fabricating a mounting member made of glass for magnetic disks, comprising providing a glass ring for a spacer ring, which includes an inner peripheral surface, an outer peripheral surface and annular contacting surfaces for contact with magnetic disks and is formed in a ring shape having a rectangular vertical cross-section; and polishing at least the contacting surfaces, and then etching the glass ring with the etching solution, followed by forming an electrically conductive film on at least the etched surfaces.

The mounting member made of glass for a magnetic disk according to the present invention is a member, which is used for firmly mounting a magnetic disk to a magnetic disk drive. Specifically, the present invention is mainly directed to a spacer ring for mounting a plurality of magnetic disks to a magnetic disk drive at certain intervals. The present invention is also directed to a glass member having contacting surfaces for contact with magnetic disks, such as a shim to be provided between a magnetic disk and a clamp, and a clamp for firmly tightening magnetic disks directly without the shim being interposed. The glass member may be made of ceramics as long as the member can be etched.

The feature of the present invention is that at least the contacting surfaces of the mounting member made of glass are made into roughened surfaces by etching, polishing or both treatments. More specifically, at least the contacting surfaces of the mounting member are etched. Or, at least the contacting surfaces of the mounting member are polished, and the polished surfaces are etched. In the latter case, since the polishing treatment for the contacting surfaces before the etching treatment is preferable from the viewpoint that the mounting member is dimensionally controlled and is provided with a surface roughness. However, it is not necessary for portions except for the contacting surfaces to be polished, depending on the kind and the dimensional accuracy of the mounting member, in some cases. For example, the spacer ring has the contacting surfaces polished to be dimensionally controlled and have a surface roughness, and the spacer ring usually has both inner and outer surfaces additionally polished for dimensional finish. On the other hand, the etching treatment may be applied only to the contacting surfaces in terms of the object of the present invention. When the entire mounting member is immersed and treated in an etching solution, portions except for the contacting surfaces are also etched together in a normal case. As the polishing method, a normal physical polishing treatment, such as lapping, is applicable.

According to a mode of the present invention, it is possible to restrain the dust generation by etching at least the contacting surfaces of the mounting member made of glass to improve the surface property of the polished contacting surfaces. Although the glass surfaces of the polished contacting surfaces are made of concavities and convexities with relatively sharp leading ends, particles are little newly generated from the completed spacer ring in use even for a long term since the etching treatment removes the sharp leading ends and almost completely eliminates the particles caused by the polishing treatment. Additionally, it is possible to improve the clamping effect to the magnetic disks to hold the magnetic disks in highly reliable fashion since the etching treatment can make the surface roughness of the polished surfaces proper in addition to the polished surfaces having the sharp leading ends removed.

BRIEF DESCRIPTION OF THE DRAWING FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
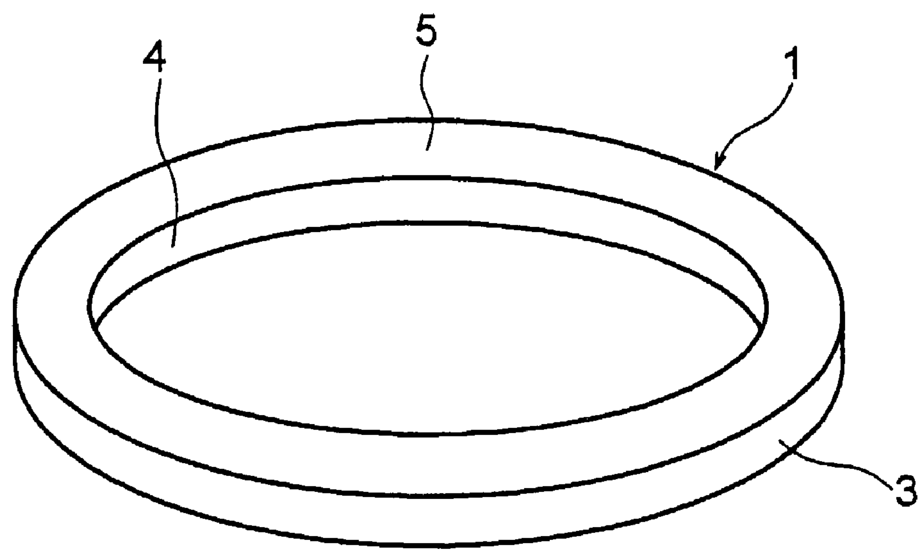
FIG. 1 is a perspective view of the spacer ring according to an embodiment of the present invention.
Figure 2:
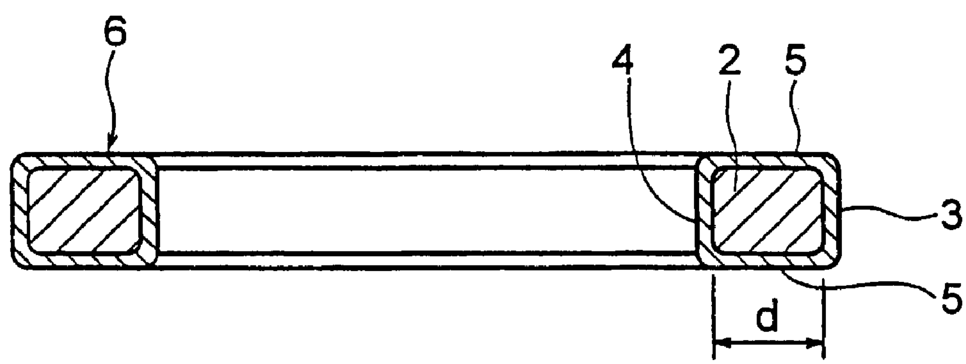
FIG. 2 is a cross-sectional view of the spacer ring taken along a plane passing through the center of the spacer ring.

Now, preferred embodiments of the mounting member made of glass for a magnetic disk according to the present invention will be described in detail, referring to the accompanying drawings showing the structure of a spacer ring and a production method therefor. FIG. 1 is a perspective view of a spacer ring 1, and FIG. 2 is a vertical cross-sectional view of the spacer ring. As clearly shown in both figures, the spacer ring 1 is an annular product, which has an electrically conductive film 6 provided on a glass ring 2, which includes upper and lower parallel contacting surfaces 5, and an outer peripheral surface 3 and an inner peripheral surface 4 extending between both contacting surfaces 5, and which has a ring-shaped portion formed in a rectangular shape in a vertical cross-section. In an actual magnetic disk drive, the spacer ring 1 has the contacting surfaces 5 in press contact with adjoining magnetic disks to hold the magnetic disks at an interval, preventing slippage from occurring between the spacer ring 1 and the magnetic disks. The interval between the magnetic disks is determined by the thickness of the spacer ring 1. The thickness of the spacer ring 1 is increased or decreased to control the interval between the magnetic disks.

In an embodiment of the present invention, the glass ring 2 as the material of the spacer ring (i.e., glass product employed for fabricating a mounting member made of glass) is fabricated first. Although not shown, the glass ring 2 may be fabricated in several kinds of methods. Examples of the methods are a method wherein a glass tube having inner and outer diameters and a wall thickness respectively corresponding to the inner and outer diameters and the width d of the contacting surfaces 5 (see FIG. 2) is cut into a round slice at a length of the thickness of the spacer ring 1 to fabricate the glass ring, a method wherein the glass ring having dimensions corresponding to the dimensions of the spacer ring 1 is cut out from a glass sheet having a thickness corresponding to the thickness of the spacer ring 1 by use of, e.g., a core drill, and a method wherein the glass ring is fabricated from molten glass by press-molding or casting. The method for fabricating the glass ring by cutting a glass tube into a round slice is superior in terms of productivity and costs.

What is important to the glass ring 2 is that the glass ring has a thermal expansion coefficient equal or approximate to that of glass magnetic disks and also approximate to that of stainless steel (SUS metal) as the material for a mounting shaft, a clamp or the like in a magnetic disk drive, in order to prevent the magnetic disks from being distorted during operation by a thermal expansion difference when the magnetic disks are fixed in the magnetic disk drive by the spacer ring.

From this viewpoint, it is preferable that the glass ring 2 has a thermal expansion coefficient between the thermal expansion coefficient of commonly used glass (about $70\times10^{-7}/°$ C.) and the thermal expansion coefficient of stainless steel (about $95\times10^{-7}/°$ C.), especially in a range from $75\times10^{-7}/°$ C. to $95\times10^{-7}/°$ C. When the glass ring 2 has a thermal expansion coefficient in one of the ranges, the difference between the spacer ring and the magnetic disks, the mounting shaft or the like can be made small in terms of thermal expansion coefficient, preventing the magnetic disks from suffering distortion. For these reasons, the material that has a thermal expansion coefficient almost included in one of the ranges is preferable as the composition and the kind of the glass for the glass ring 2. Soda lime glass, aluminosilicate glass or flint glass is generally applicable.

The glass ring 2 thus fabricated has the contacting surfaces 5 polished by, e.g., lapping. The polishing operation is carried out mainly for the purpose of improving the parallelism and the flatness of the contacting surfaces 5. When the glass ring 2 has poor dimensional accuracy, it is preferable that the lapping operation is carried out after rough grinding. The parallelism and the flatness of the contacting surfaces 5 are particularly important to the spacer ring 1 from the viewpoint of holding the magnetic disks in a distortion-free state. When one of the parallelism and the flatness is bad, it becomes difficult to hold the magnetic disks in good fashion. For example, when the flatness of the contacting surfaces 5 is bad, it becomes difficult to hold the magnetic disks in uniform fashion. When the parallelism is worse than a certain level, it becomes impossible to hold the magnetic disks by the entire areas of the contacting surfaces 5, which could create a problem in that the anti-slip property of the spacer ring deteriorates to degrade a clamping function. In order to solve these problems to hold the magnetic disks in a distortion-free state, the parallelism of the contacting surfaces 5 is preferably 5 $\mu$m or less, more preferably 3 $\mu$m or less, and the flatness is preferably 2 $\mu$m or less, more preferably 1 $\mu$m or less.

By polishing the contacting surfaces 5 as stated earlier, the contacting surfaces 5 are provided with a desired surface roughness. The surface roughness of the contacting surfaces is extremely significant to improve the anti-slip property of the spacer ring. In other words, since the magnetic disks have extremely smooth surfaces, the spacer ring, the contacting surfaces 5 of which are as smooth as the magnetic disks, creates a problem. Specifically, when the magnetic disks are rotated rapidly, or a great impact is applied to the magnetic disk drive, slippage may occur between the magnetic disks and the spacer ring to cause a positional shift, preventing the magnetic heads from reading or writing information data correctly. As a solution for this problem, it has been proposed to provide the contacting surfaces with a desired surface roughness to improve the anti-slip property. The surface roughness will be described later.

The glass ring 3, which has had the contacting surfaces polished, has the inner peripheral surface 4 and the outer peripheral surface 3 polished. By this polishing operation, the inner peripheral surface 4 and the outer peripheral surface 3 are finished having desired dimensions. When the inner peripheral surface 4 and the outer peripheral surface 3 have good dimensions and roundness, this polishing operation may be omitted. In most cases, this polishing operation is made as one of the standard operations for preparing the spacer ring. Specifically, the inner peripheral surface 4 is polished such that the spacer ring can accept the mounting shaft of the magnetic disk drive by forming the inner diameter of the spacer ring in a slightly greater size than the mounting shaft. On the other hand, the outer peripheral surface 3 is polished such that the width d of the contacting surfaces 5 (see FIG. 2) is formed in a desired length. Although the explanation was made about a case wherein the inner peripheral surface 4 and the outer peripheral surface 3 are polished after the contacting surfaces have been polished, the inner and outer peripheral surfaces may be polished first.

Additionally, the edges of the inner peripheral surface 4 and the outer peripheral surface 3 may be chamfered, besides the inner peripheral surface 4 and the outer peripheral surface 3 are polished. Since the edges of the inner peripheral surface 4 and the outer peripheral surface 3 are extremely sharp before being machined, the edges are easily chipped and broken by contact with something or application of a force. From this viewpoint, the edges are chamfered to be tapered or curved as shown in FIG. 2, being formed into a shape having no sharp portions. In most cases, each of the inner peripheral surface 4 and the outer peripheral surface 3 is polished and chamfered simultaneously by use of a grinding stone, which can carry out the polishing operation for one of the inner and outer peripheral surfaces and the chamfering operation for the one peripheral surface.

Figure 3:
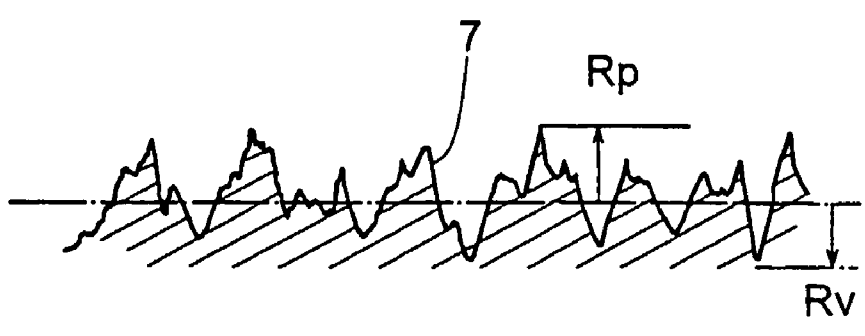
FIG. 3 is an enlarged cross-sectional view of a lapped contacting surface of a glass ring for the spacer ring.

Now, explanation will be made about the etching operation for the contacting surfaces of the glass ring. FIG. 3 is an enlarged cross-sectional view of the glass surface, which is formed by lapping a contacting surface 5 of the glass ring. As shown in FIG. 3, the lapped contacting surface is a roughened surface, which includes variety sizes of concavities and convexities 7 having the highest top Rp (hereinbelow, referred to as Rp) and the lowest bottom Rv (hereinbelow, referred to as Rv). The leading ends of the concavities and convexities 7 are generally sharp. Since the sharp leading ends cause the generation of dust as stated earlier, there have been demands to improve the sharp leading ends in the spacer ring.

An embodiment of the present invention is characterized in that the surface property of the contacting surfaces 5 is improved by etching the contacting surfaces thus lapped or physically polished. Specifically, the sharp leading ends formed on the polished surfaces are etched to be removed and be made round, and the polished contacting surfaces are further chemically polished to make the surface roughness of the contacting surfaces proper. In other words, the surface roughness is increased. By making the sharp leading ends round, the generation of dust can be decreased or avoided. By making the surface roughness of the contacting surfaces proper, the anti-slip property and the clamping function of the spacer ring after mounting of the magnetic disks can be improved.

Detailed explanation of the etching operation for the glass ring in the embodiment of the present invention will be omitted since this operation is substantially the same as a conventional etching operation for glass. The etching operation may be easily carried out by immersing the glass ring in a mixing solution of, e.g., hydrofluoric acid and sulfuric acid after carrying out the polishing operation for at least the contacting surfaces. In the etching operation, although the etching solution may contains only hydrofluoric acid, the addition of sulfuric acid can make the etching quantity stable.

Figure 4:
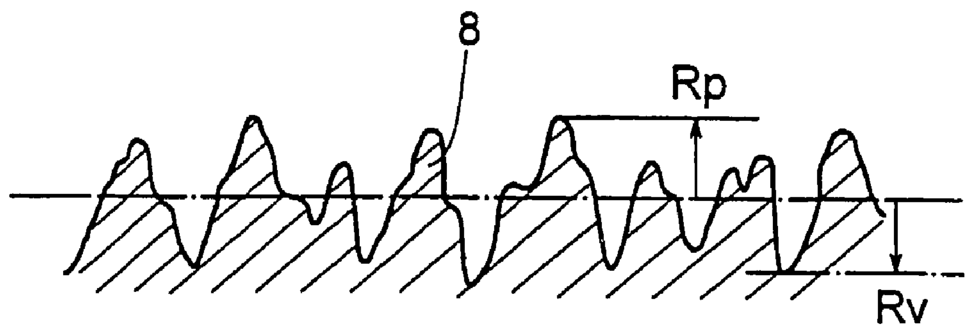
FIG. 4 is an enlarged cross-sectional view of the lapped contacting surface shown in FIG. 3, which has been subjected to etching.

FIG. 4 is an enlarged cross-sectional view of the glass surface, wherein the polished surface shown in FIG. 3 has been etched. As clearly shown in FIG. 4, the concavities and convexities, which have had the sharp leading ends before etching as shown in FIG. 3, are etched to be formed into round concavities and convexities 8. By this etching operation, the concavities are further deepened, providing the glass surface with a roughened surface, which is different from the glass surface in terms of the appearance and the surface roughness of the concavities and convexities before carrying our the etching operation. Specifically, in the case of the polished surface before etching shown in FIG. 3, the average surface roughness Ra at, e.g., the centerline (hereinbelow, referred to as Ra) is about 0.32 $\mu$m, Rp is about 1.0 $\mu$m, and Rv is about 1.6 $\mu$m. On the other hand, after the etching operation shown in FIG. 4, Ra is about 0.64 $\mu$m, Rp is about 1.6 $\mu$m, and Rv is about 3.0 $\mu$m. In the present invention, Rp as well as Ra should be considered seriously since Rp has a significant effect on the anti-slip property of the spacer ring in terms of the surface roughness.

In the embodiment of the present invention, the etching solution, the etching conditions, the etching time and the like in the etching operation are adequately controlled so as to bring the surface roughness after etching into a certain range since the surface roughness of the contacting surfaces of the spacer ring is substantially determined by the surface roughness of the glass ring after etching. With respect to the surface roughness of the roughened surfaces after etching, it is preferable that Ra is 0.3 to 1.0 $\mu$m, and that Rp is 0.8 $\mu$m or more. When either one of Ra and Rp is below the preferable range therefor, slippage is apt to occur on the magnetic disks, which have been mounted by use of the spacer ring. In particular, when Rp is smaller than 0.5 $\mu$m, the anti-slip property of the spacer ring deteriorates. When Ra and Rp are beyond the respective preferable ranges, not only the etching time become long but also the anti-slip property of the spacer ring tends to lower.

The surface roughness before etching is closely related with the surface roughness of the roughened surfaces subjected to etching, though being not directly related. When the surface roughness of the polished surfaces before etching is in a certain range, it is easy to obtain a desired surface roughness by etching. With respect to the surface roughness of the polished surfaces before etching, it is preferable that Ra and Rp are in a range from 0.2 to 0.5 $\mu$m and a range of 0.7 $\mu$m or more, respectively.

When the contacting surfaces of the glass spacer are only lapped as usual, the upper limits for the surface roughness of the contacting surface are 0.35 $\mu$m for Ra and 1.2 $\mu$m for Rp. According to the embodiment of the present invention, the upper limits can be increased to about 0.75 $\mu$m for Ra and about 1.8 $\mu$m for Rp, respectively, since the surface property can be improved by etching the lapped surfaces. The surface roughness can be increased by the etching operation without need for any special device. The increased surface roughness can extremely improve the anti-slip property of the spacer ring.

Although portions of the glass ring except for the contacting surfaces are not necessarily etched in the present invention, the portions except for the contacting surfaces are normally etched along with the contacting surfaces since the entire glass ring is immersed in the etching solution. As a secondary advantage offered by etching the portions except for the contacting surfaces, small projections or glass particles formed or deposited on the glass ring can be eliminated more effectively in comparison with washing, contributing to further decrease the generation of dust.

Additionally, the spacer ring 1 according to the present invention has a structure wherein, as shown in FIG. 2, the electrically conductive film 6 is formed on at least the contacting surfaces 5 of the glass ring 2 subjected to etching such that the static electricity charged on a magnetic disk is discharged outside. Although there is no limitation to the material of the electrically conductive film 6 as long as the material can be formed as a thin film having a small electrical resistance, a metallic material or metallic oxide, such as $SnO_2$, ITO, Au or Cu, is normally appropriate. $SnO_2$, $SnO_2$ with F doped therein, $SnO_2$ with Sb doped therein, ITO ($In_2O_3$ with Sn doped therein) and ZnO with Ga doped therein or the like is particularly preferable. From the viewpoint that the static electricity charged on a magnetic disk is reliably discharged outside through the electrically conductive film 6, the electrical resistance of the electrically conductive film 6 is preferably 10 MΩ or less, more preferably 1 MΩ or less. Although the film thickness is set to be as small as possible in such a range that the film has an electrical resistance of 1 MΩ or less, the film thickness is preferably 0.1 um or less, normally about 0.05 μm.

The formation of the electrically conductive film 6 on the etched contacted surfaces of the glass ring 2 has no significant effect on the surface roughness of the contacting surfaces since the film thickness of the electrically conductive film is quite small. Since the surface roughness of the contacting surfaces of the spacer ring 1 with the electrically conductive film 6 formed thereon is almost the same as the surface roughness of the contacting surfaces of the spacer ring 1 before formation of the electrically conductive film 6, the surface roughness of the glass ring 2 after formation of the electrically conductive film 6 may be regarded as being the same as the surface roughness of the glass ring 2 per se.

There is no limitation as to how to form the electrically conductive film 6. A chemical vapor deposition method, a spray method, a liquid immersion method or the like is applicable. The chemical vapor deposition method (hereinbelow, referred as to the CVD method) means a method wherein a material that is capable of being thermally decomposed and forming a film having a certain composition, such as an organic metal compound, is heated to be evaporated, the evaporated material is conveyed into a coating chamber with a carrier gas, such as air, oxygen or inert gas, and the evaporated material is reacted, on the glass ring 2, with oxygen or water in the ambience or on the glass ring 2 to form the film having a certain composition. The spray method means a method wherein a source material that is capable of forming a film is dissolved or dispersed in an organic solvent, the glass ring 2 is preliminarily heated to 400 to 600° C., the source material thus dissolved or dispersed is sprayed on the heated glass ring 2 to form a film on the glass ring. The liquid immersion method means a method wherein a source material that is capable of forming a film is dissolved or dispersed in a liquid, such as an organic solvent, the glass ring 2 is immersed in the liquid, and then the film is formed on the glass ring while the glass ring is being pulled up. When the electrically conductive film 6 is formed by the chemical vapor deposition method or the liquid immersion method, it is preferable from the viewpoint of making the film firm that the film is heated and baked to 300 to 500° C.

Figure 8:
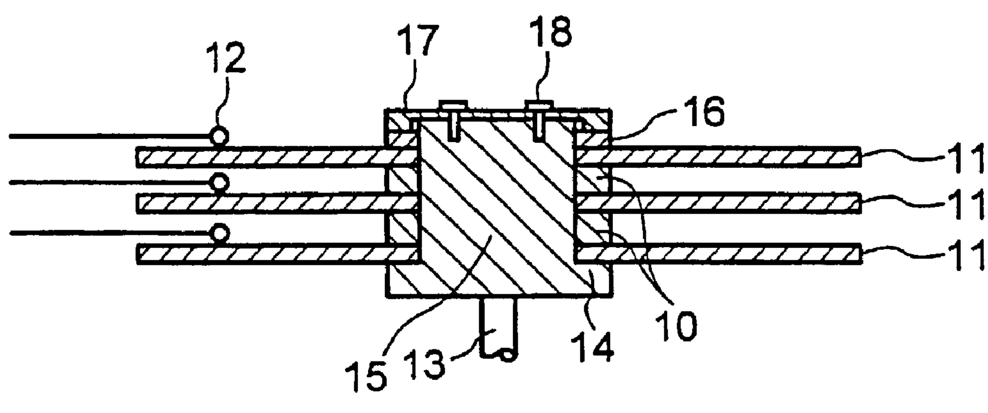
FIG. 8 is a cross-sectional view of an example of a disk drive.

When the electrically conductive film 6 is formed on the glass ring 2, the electrically conductive film is normally formed on the entire surface of the spacer ring 1 as shown in FIG. 2. The electrically conductive film 6 may be partly formed on the glass ring 1 as long as the static electricity can be discharged outside through the mounting shaft 15 (see FIG. 8). When the electrically conductive film is formed on each of the upper and lower contacting surfaces 5 in contact with the magnetic disks, the electrically conductive film may be formed on one of the inner peripheral surface 4 and the outer peripheral surface 3, e.g., only the inner peripheral surface 4, for electrical conduction between the electrically conductive films on the upper and lower contacting surfaces. When the glass ring is made of electrically conductive glass or ceramics, the electrically conductive film may be omitted since the static electricity charged on a magnetic disk can be discharged outside directly through the glass ring.

Figure 5:
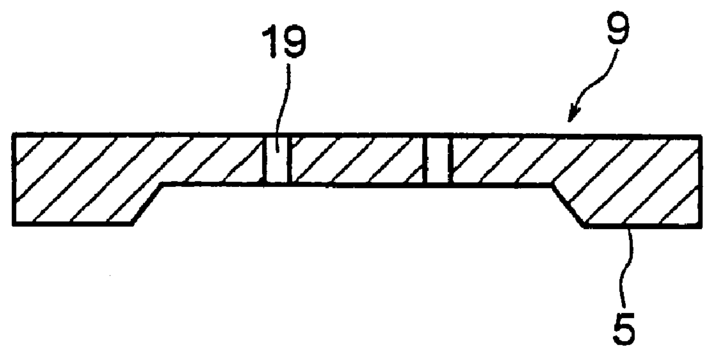
FIG. 5 is a cross-sectional view of a clamp according to another embodiment of the present invention.

FIG. 5 is a cross-sectional view of a clamp 9 according to another embodiment of the mounting member made of glass for a magnetic disk of the present invention. The clamp 9 is a mounting member made of glass, by which magnetic disks and spacer rings alternately mounted to the mounting shaft are secured from above, and which is formed in a disk shape having a lower peripheral portion provided with a contacting surface 5 for pressing the magnetic disks. Reference numeral 19 designates a hole, which is used to tighten and secure the magnetic disks from above with a bolt. The clamp 9 has at least the contacting surface 5 etched, made into a roughened surface by polishing and also etched, or provided with the electrically conductive film, as required, as in the spacer ring.

EXAMPLE 1

Three samples of spacer rings shown as Examples 1 to 3 in Table 1 were provided by fabricating glass rings (outer diameter: 23.6 mm, inner diameter: 20.0 mm and thickness: 1.67 mm) and subjecting the glass rings to different treatments of 1) lapping as polishing, 2) etching, and 3) formation of an electrically conductive film, which are specified below. Sample 1 is a comparative example, and Samples 1 and 3 are examples.

1) Lapping

The glass rings had the upper and lower contacting surfaces lapped at a thickness of about 100 μm.

2) Etching

Two of the glass rings subjected to the lapping treatment 1) were etched by being immersed in a mixing solution of hydrofluoric acid (5%) and sulfuric acid (10%).

3) Formation of an Electrically Conductive Film

The glass rings except for one of the glass rings subjected to the etching treatment 2) had a $SnO_2$ film formed at a thickness of about 0.05 μm on the entire surface including the contacting surfaces by a CVD method.

TABLE 1

| | Lapping | Etching | Formation of electrically conductive film |
|---|---|---|---|
| Sample 1 (Comparative Example) | done | not done | done |
| Sample 2 (Example of the present invention) | done | done | not done |
| Sample 3 (Example of the present) | done | done | done |

The amount of dust generation (the amount of particle generation) from each of the three samples of spacer rings was measured by the measuring method specified below. The measurement results are shown in Table 2.

"Method for Measuring the Amount of Dust Generation"

Figure 6:
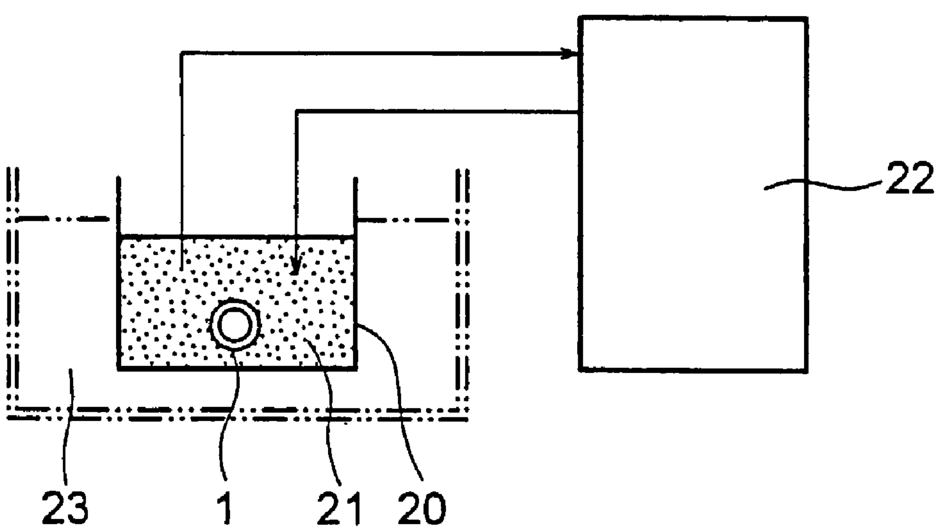
FIG. 6 is a schematic view of a measuring system for measuring an amount of dust generation from a spacer ring.

An ultrasonic washing machine 23 shown in FIG. 6 (manufactured by Branson Ultrasonics Corporation: output of 120 W, frequency of 47 kHz) and a counter for counting particles in a liquid 22 were utilized. According to the following steps, ultrasonic vibration was applied to each of the spacer rings in a liquid, and the amount of the particle generation from each of the spacer rings 1 is detected by using the counter for counting particles in a liquid 22 to measure the amount of the particles caused by application of the ultrasonic vibration.

1) Measurement of the Amount of Particles in Ultrapure Water

Before measurement with respect to the samples, ultrapure water 21 of 300 ml was poured into beakers 20, and the particle amount (A) per 1 ml in the ultrapure water in each of the beakers was measured by the counter for counting particles in a liquid 22.

2) Measurement of the Amount of Particles

Next, the respective spacer rings 1 were put into the different beakers 20, the beakers 20 were, in turn, put into the ultrasonic washing machine 23 with water put therein, and ultrasonic vibration was, in turn, applied to each of the different spacer rings for 1 min. After application of the ultrasonic vibration, each of the beakers was taken out from the machine 23, and the particle amount (B) per 1 ml in the ultrapure water in each of the beakers was measured by the counter for counting particles in a liquid 22.

3) Calculation of the Amount of Dust Generation

The amount of dust generation (C) was calculated according to the formula of the amount of dust generation (number/300 ml)=((B)−(A))×300 with respect to each of the spacer rings.

TABLE 2

| | Amount of Dust Generation (C) |
|---|---|
| Sample 1 (Comparative Example) | 29430 |
| Sample 2 (Example of the present invention) | 6220 |
| Sample 3 (Example of the present) | 5400 |

As clearly seen from Table 2, in the case of the spacer ring of Sample 1, wherein the glass ring had had the contacting surfaces lapped without etched and had had the electrically conductive film formed thereon, the amount of dust generation was about 30,000 particles. On the other hand, in the case of the spacer ring of Sample 2, wherein the glass ring had had the contacting surfaces lapped and etched without having had the electrically conductive film formed thereon, the amount of dust generation significantly decreased to 21% of the amount of dust generation of Sample 1. Additionally, in the case of the spacer ring of Sample 3, wherein the glass ring had had the contacting surfaces lapped and etched and had had the electrically conductive film formed thereon, the amount of dust generation significantly decreased to 18% of the amount of dust generation of Sample 1. The measurements reveal that the generation of dust (particles) from the spacer rings cannot be avoided or decreased only by formation of the electrically conductive film, and that the etching treatment offers a significantly advantageous effect on the prevention of dust generation from the spacer rings since the amount of dust generation abruptly decreased when the lapped or polished contacting surfaces were etched. Additionally, the measurements reveal that the amount of dust generation further decreased by forming the electrically conductive film after the etching treatment.

As a reference example, a spacer ring was fabricated from a ceramic ring (materials: Mg and Si type), which had the same specifications as Example 1, and which had the contacting surfaces polished. The amount of dust generation in this spacer ring was measured by the same measuring method. The amount of dust generation was 17,250 particles, which is 2.5 to 3 times greater than the amount of dust generation in Sample 2 or Sample 3 as the embodiments of the present invention.

EXAMPLE 2

With respect to Sample 1 and Sample 3 in Example 1, the lapped contacting surfaces of Sample 1, the etched contacting surfaces of Sample 3 (before film formation) and the etched contacting surfaces of Sample 3 (after film formation) were measured in terms of surface roughness Ra and Rp. The measurements are shown in Table 3. The measurement of the surface roughness was made by use of a TALYSURF gauge.

Figure 7:
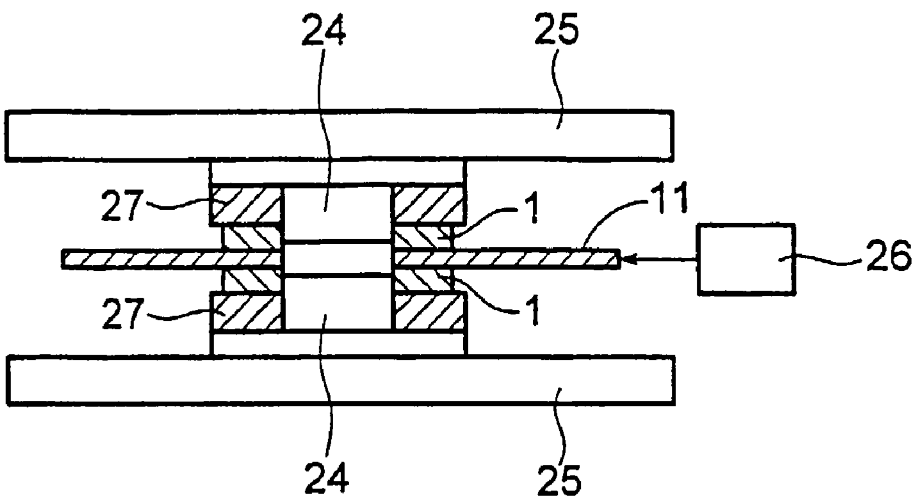
FIG. 7 is a schematic cross-sectional view of a slip test system for a spacer ring.

With respect to the spacer rings of Sample 1 and Sample 3, a slip test was additionally carried out by use of a load test system shown in FIG. 7. In the slip test, two spacer rings 1 to be tested were held on respective spindles 24 so as to be stationary. A magnetic disk 11 was set to be sandwiched between the spacer rings 1 so that only the magnetic disks 11 moved against the friction resistance of the spacer rings 1 when the magnetic disk had a load laterally applied thereto by a push gauge 26. On the other hand, the spacer rings 1 had a weight (G) applied thereto by bases 25 through spacers 27. The load (F) that was applied to the magnetic disk 11 when the magnetic disk started moving was measured by the push gauge to evaluate the anti-slip property of the spacer rings 1.

In order to make comparison with other materials, spacer rings were fabricated from ceramics (the same as the reference example in Example 1) and from stainless steel (SUS) so as to have the same specifications as Sample 1 and Sample 3. The slip test was carried out for these spacer rings along with the spacer rings of Sample 1 and Sample 3. The test results are shown in Table 4.

TABLE 3

| | | Surface Roughness | |
|---|---|---|---|
| | | Ra (μm) | Rp (μm) |
| Sample 1 (Comparative Example) | | 0.32 | 1.0 |
| Sample 3 (Example of the present invention | Before film formation | 0.65 | 1.6 |
| | After film formation | 0.61 | 1.6 |

TABLE 4

| Weight G (kg) | Sample 1 Ra: 0.32 μm Rp: 1.0 μm Load F (kg) | Sample 3 Ra: 0.65 μm Rp: 1.6 μm Load F (kg) | Ceramics Ra: 0.18 μm Rp: 0.46 μm Load F (kg) | SUS Ra: 0.03 μm Rp: 0.15 μm Load F (kg) |
|---|---|---|---|---|
| 5 | 1.8 | 2.7 | 1.7 | 1.8 |
| 10 | 3.0 | 5.1 | 3.1 | 3.0 |
| 15 | 4.0 | 7.4 | 4.5 | 3.6 |
| 20 | 5.7 | 9.7 | 6.6 | 4.9 |

Table 3 shows that when the lapped glass ring of Sample 1 was etched, the lapped polished surfaces had the surface roughness increased to about 2 times for Ra and 1.6 times for Rp by the etching treatment. Since Table 3 shows that the surface roughness before film formation was substantially the same as the surface roughness after film formation, it is revealed that even if the electrically conductive film is formed at a film thickness of 0.05 μm, there is no substantial change in the surface roughness.

Additionally, Table 4 shows that the etched spacer ring of Sample 3 had such an anti-slip property that the spacer ring was able to withstand a greater push gauge load than the unetched spacer ring of Sample 1 by 50% to 80% with respect to the same load. This reveals that the anti-slip property of the etched spacer ring of Sample 3 was significantly improved. Table 4 also shows that the spacer ring of Sample 3 had a superior anti-slip property in comparison with the spacer rings made of ceramics and SUS. It is estimated that the main reason why the anti-slip property of the spacer ring according to the present invention was improved is that the surface roughness was increased by the etching treatment to improve the surface property.

Embodiment 3

Three members made of soda lime glass similar to magnetic disks were fabricated in a ring shape having an outer diameter of 32 mm, an inner diameter of 25 mm and a height of 2 mm. After being polished, the members were etched to obtain respective etching amounts of 10 μm, 20 μm and 30 μm by being immersed into a mixing solution of 5% of hydrofluoric acid and 10% of sulfuric acid for a certain time period. The glass rings thus prepared were washed with a 3% alkali cleaning liquid and were further washed with tap water to remove the residual materials caused by the etching treatment. After that, an electrically conductive film, which had a thickness of 0.05 μm and was made of an $SnO_2$ film with F doped therein was formed on the glass rings by a CVD method. Thus, Samples 4 to 6, which had the different etching amounts, were obtained as spacer rings for magnetic disks. As a comparative example, Sample 7 as a spacer ring for magnetic disks was obtained from a ring, which was fabricated and polished in the same way as Samples 4 to 6 without being etched. As another comparative example, Sample 8 as a spacer ring for magnetic disks was obtained by forming an electrically conductive film similar to Samples 4 to 6 on a ring, which was fabricated and polished in the same way as Sample 7. The amount of particle generation (the amount of dust generation) from each of all Samples was measured by the measuring method stated earlier. Table 5 shows the measurement results.

TABLE 5

| | Examples of the Present Invention | | | Comparative Examples | |
|---|---|---|---|---|---|
| | Sample 4 | Sample 5 | Sample 6 | Sample 7 | Sample 8 |
| Etching Amount (μm) | 10 | 20 | 30 | 0 | 0 |
| Presence and Absence of Electrically Conductive Film | Formed | Formed | Formed | Not Formed | Formed |
| Amount of Dust Generation (number/300 ml) | 19,620 | 13,940 | 5,400 | 80,600 | 29,430 |

In accordance with the present invention, it is possible to restrain particles from being generated from the glass spacer ring by etching the surface of the spacer ring. It is possible to further restrain particles from being generated from the glass spacer ring by carrying out the etching treatment and the formation of the electrically conductive film. It is possible to significantly improve the long-term reliability of a hard disk drive for magnetic recording by employing the spacer ring for magnetic disks according to the present invention.

In accordance with the present invention, at least the polished contacting surfaces of the spacer ring are formed as roughened surfaces caused by the etching treatment as stated earlier. As a result, the amount of dust generation from the spacer ring can significantly be reduced with a desired surface roughness maintained, providing the spacer ring with a long-term reliability. The amount of dust generation can be further reduced by forming the electrically conductive film on the etched contacting surfaces.

The polished contacting surfaces can be etched to remove sharp leading ends and form the leading ends into round concavities and convexities and to increase the surface roughness, improving the surface property of the contacting surfaces. As a result, the anti-slip property of the spacer ring to magnetic disks can be improved. Thus, since the spacer ring according to the present invention can sufficiently firmly hold the magnetic disks even by a smaller clamping force applied to the magnetic disks than the conventional spacer rings, the spacer ring according to the present invention can decrease or restrain the distortion of the magnetic disks by a reduction in the clamping force. In particular, the spacer ring according to the present invention can increase the surface roughness of the contacting surfaces in comparison with the conventional spacer rings that have been subjected only to the polishing treatment, since the spacer ring according to the present invention has the contacting surfaces formed as concavities and convexities without sharp leading ends. Additionally, the spacer ring according to the present invention can stably hold the magnetic disks for a long term since the leading ends of the concavities and convexities are not sharp, though the surface roughness is increased.

The entire disclosure of Japanese Patent Application No. 2002-074809 filed on Mar. 18, 2002 including specification, claims, drawings and summary is incorporated herein by reference in its entirety.

What is claimed is:

1. A mounting member made of glass for a magnetic disk, which is used for firmly mounting a magnetic disk to a magnetic disk drive, comprising a body having a polished and etched contacting surface for contact with a magnetic disk, wherein concavities and convexities provided in the contacting surface by polishing and etching the contacting surface are rounded as compared to concavities and convexities in the polished surface which has not been etched.

2. The mounting member according to claim 1, wherein the mounting member comprises a spacer ring, which includes annular contacting surfaces for contact with magnetic disks and is formed in a ring shape having a rectangular vertical cross-section, and wherein at least the contacting surfaces of the spacer ring are etched.

3. The mounting member according to claim 1, wherein a contacting surface has an electrically conductive film formed on at least the etched surface.

4. A mounting member made of glass for a magnetic disk, which is used for firmly mounting a magnetic disk to a magnetic disk drive, comprising:

a contacting surface for contact with a magnetic disk; and the contacting surface being formed as a roughened surface by etching, wherein the roughened surface has a surface roughness of Ra from 0.3 to 1.0 $\mu$m and Rp from 0.8 $\mu$m or more.

* * * * *